United States Patent [19]

Roufs et al.

[11] Patent Number: 5,047,194
[45] Date of Patent: Sep. 10, 1991

[54] METHOD OF MAKING A POTTERY BOWL WITH INTEGRAL CATCH TRAY

[75] Inventors: William J. Roufs, Whittier, Calif.; Kenneth A. Fait, 26392 Via Conchita, Mission Viejo, Calif. 92691

[73] Assignee: Kenneth A. Fait, Mission Viejo, Calif.

[21] Appl. No.: 583,032

[22] Filed: Sep. 14, 1990

[51] Int. Cl.⁵ .................... A01G 9/02; B28B 1/02; B28B 1/29; B28B 11/08
[52] U.S. Cl. ......................... 264/155; 47/71; 264/130; 264/133; 264/232; 264/296; 264/310; 264/336; 425/263; 425/268; 425/459
[58] Field of Search .............. 264/130, 296, 154–156, 264/336, 310, 133, 232; 425/459, 263, 265, 267, 268; 47/71

[56] References Cited

U.S. PATENT DOCUMENTS

| | | |
|---|---|---|
| 467,609 | 1/1892 | Mishler ........................... 425/459 |
| 1,230,017 | 6/1917 | Oakes ............................. 425/265 X |
| 1,309,046 | 7/1919 | Podmore ......................... 425/265 |
| 1,344,885 | 6/1920 | Hall ................................. 264/86 |
| 2,033,827 | 3/1936 | Harvey et al. .................. 425/265 |
| 2,034,707 | 3/1936 | Benard ............................. 425/265 X |
| 2,370,410 | 2/1945 | Miller ............................. 425/265 X |
| 2,599,910 | 6/1952 | Guthrie ........................... 425/267 |
| 2,867,885 | 1/1959 | Abberley et al. ................ 425/265 |
| 3,386,140 | 6/1968 | Brückner ......................... 425/267 X |
| 4,102,622 | 7/1978 | Simpson ......................... 425/268 |

Primary Examiner—Jan H. Silbaugh
Assistant Examiner—Karen Aftergut
Attorney, Agent, or Firm—Edgar W. Averill, Jr.

[57] ABSTRACT

A pottery bowl with an integral catch tray. The process of forming the pottery bowl includes molding a bowl with a thickened sidewall adjacent to the bottom thereof. The bowl is then placed on a potter's wheel and a shaping tool is inserted into the thickened portion to form an integral catch tray. The shaping tool for forming the catch tray preferably has a rounded tip from which a stream of water is emitted.

6 Claims, 2 Drawing Sheets

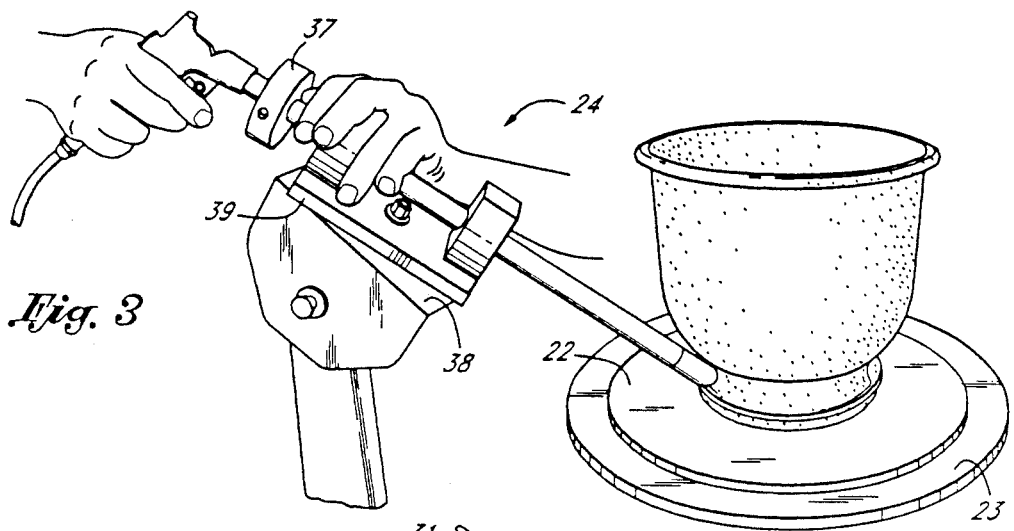
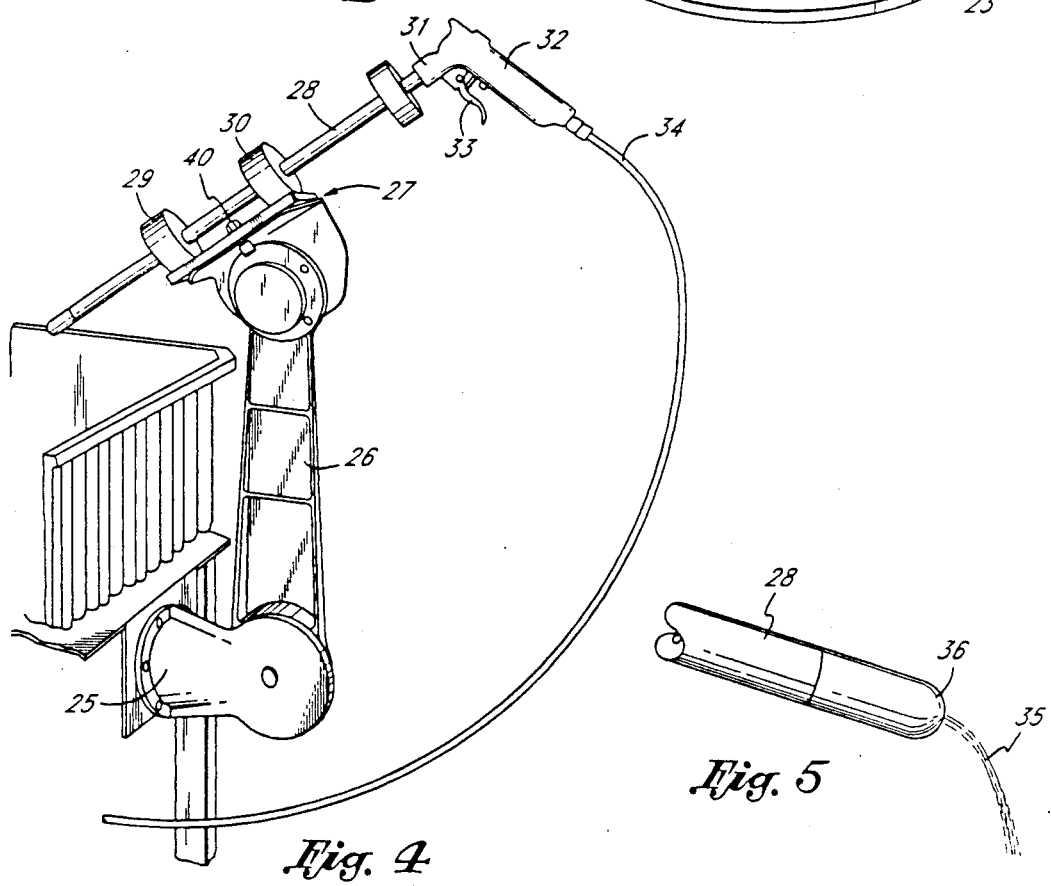

METHOD OF MAKING A POTTERY BOWL WITH INTEGRAL CATCH TRAY

BACKGROUND OF THE INVENTION

The field of the invention is pottery and the invention relates more particularly to the forming of pottery greenware. The invention further relates to pottery bowls of the type used most commonly for the growing of plants which include a catch tray and a passageway from the pottery bowl to the catch tray for the passage of water.

Typically pottery bowls having a catch tray are molded in two separate processes. One process forms the bowl and the second forms the catch tray. These may be either glazed and fired separately or together where they are held together by the fusing of the glaze from the bowl portion to the catch tray portion. The use of two separate parts increases the labor involved to fabricate the bowl and catch tray and further increases the cost of shipping and results in additional breakage if the two parts are separate.

Recently an efficient process has found acceptance in high volume pottery forming operations which utilizes a ram press and a male and female mold which molds exude water through the walls thereof to assist in removing the formed greenware piece after it has been formed in the mold. In the past however, the bowl was molded in one mold and the tray in a second mold.

SUMMARY OF THE INVENTION

The present invention is for a pottery bowl with an integral catch tray wherein the bowl portion includes an upper rim, generally cylindrical sidewalls and a bottom. A catch tray has a bottom which is integral with the bowl portion and has outwardly and upwardly extending tray walls extending from the bottom of the bowl portion.

The process for forming a pottery bowl with an integral catch tray includes the steps of placing clay into a first mold half and forcing a second mold half into the first mold half preferably by way of a ram press. The improvement of the present invention includes the steps of forming a thickened sidewall at the bottom of the greenware bowl. The molded greenware bowl is then placed onto a bat on a potter's wheel and turned. A shaping tool including a tip is held at an angle from the horizontal and is slowly moved into thickened sidewall portion at the bottom of the greenware bowl thereby forming an integral catch tray from the thickened portion of the bowl.

The pottery shaping tool has a support arm which is affixed to the frame of a potter's wheel assembly. A support table has at least one support block which holds a longitudinally movable shaping arm which has a rounded tip. A lubricant is introduced adjacent to the rounded tip and preferably through the center thereof.

BRIEF DESCRIPTION OF THE DRAWINGS

FIG. 3 is a perspective view of the pottery forming tool used to form the integral catch tray in the greenware bowl of FIG. 1.

FIG. 4 is a perspective side view of the forming tool of FIG. 3.

FIG. 5 is an enlarged perspective view of the tip of the forming tool of FIG. 3.

DESCRIPTION OF THE PREFERRED EMBODIMENTS

Figure 1:
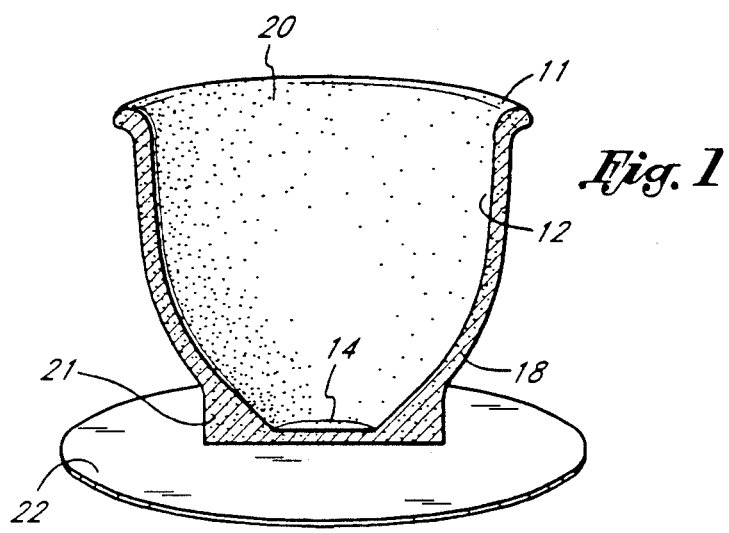
FIG. 1 is a cross sectional side view of a greenware bowl having a thickened portion at the sidewalls adjacent to the bottom thereof.
Figure 2:
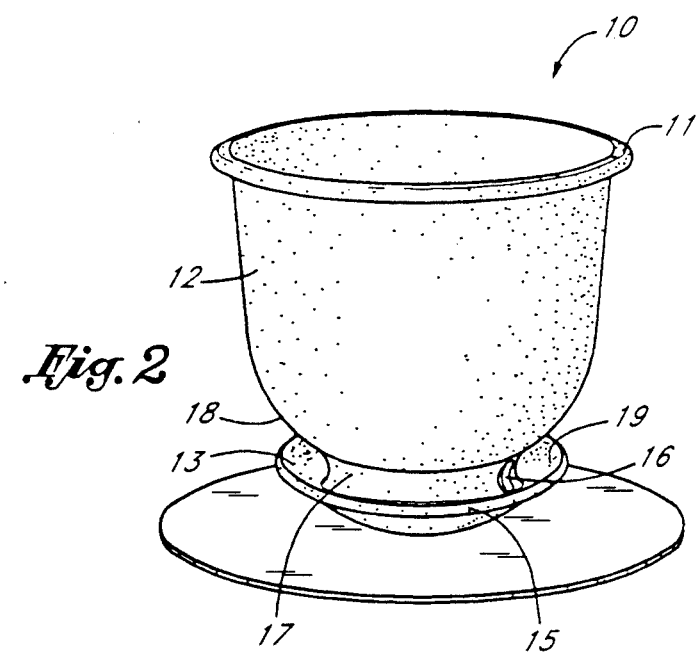
FIG. 2 is a perspective view of a greenware bowl with an integral catch tray.

A greenware clay bowl is shown in FIG. 2 of the drawings and indicated generally by the reference character 10. Clay bowl 10 has a bowl portion which has an upper rim 11, a generally cylindrical sidewall 12, and a catch tray 13 which has a bottom which is integral with bottom 14 of the bowl shown in cross-sectional view in FIG. 1. Catch tray 13 has an upwardly extending catch tray wall 19, which extends upwardly and outwardly from bottom 14 and ends in a catch tray rim 15. A passageway 16 extends through the bottom portion 17 at the base of the inwardly curved portion 18 of sidewall 12. The clay bowl shown in FIG. 2 is a greenware bowl which is to say it has not been dried or fired.

The clay bowl 10 with the integral catch tray that is shown in FIG. 2 is formed from the greenware bowl 20, shown in FIG. 1 which similarly has the same upper rim 11, generally cylindrical sidewalls 12, inwardly curved sidewalls 18, and bottom 14 as clay bowl 10 in FIG. 2. Greenware bowl 20 however, has a thickened sidewall 21, adjacent bottom 14. Greenware bowl 20 is centered on a bat 22.

Bat 22 is placed on a potter's wheel 23 as shown in FIG. 3 of the drawings. A pottery forming tool indicated generally by reference character 24 is shown best in FIG. 4 of the drawings. Forming tool 24 has a support arm assembly which comprises a horizontal arm 25, a vertical arm 26, and a support table 27. Support table 27 may be adjusted with respect to vertical arm 26 to set the arm at any appropriate angle. An angle of about 45 degrees is typically appropriate for forming the bowl of FIG. 2.

Pottery forming tool 24 has a longitudinally movable forming arm 28 which is held by a pair of support blocks 29 and 30, which in turn are held by support table 27. As seen best in FIG. 3 support table 27 is preferably formed in two portions, a base portion 38, and an upper portion 39 held together by screw and nut assembly 40. Arm 28 is a generally cylindrical arm and support blocks 29 and 30 have a generally cylindrical opening through which forming arm 28 may be readily pushed inwardly or outwardly. Forming arm 28 has a hollow center passageway and includes a water nozzle 31 which has a handle 32 and a trigger 33. A water hose 34 is connected to handle 32 and provides a flow for water through nozzle 31 when trigger 33 is depressed. As shown best in FIG. 5, a stream of water 35 flows out from the center of tip 36 which is at the lower end of forming arm 28. Tip 36 is preferably generally hemispherical and the stream of water 35 flows out of a hole in the center of the hemispherical tip 36. Tip 36 is threaded into the end of forming arm 28 in a conventional manner and forming arm 28, as stated above, is basically a hollow pipe.

In use, as shown best in FIG. 3 the longitudinally movable forming arm 28 is manipulated by grasping handle 32 of water nozzle 31 and moving the forming arm downwardly so that tip 36 contacts thickened sidewall 21 of greenware bowl 20. The trigger 33 is depressed to feed a stream of water out of the center of tip 36 as the longitudinally movable forming arm 28 is slowly depressed inwardly so that tip 36 penetrates sidewall 21 to form the upwardly extending catch tray wall 19. Preferably a stop disk 37 is adjustably affixed to arm 28 to assist in manipulating the downward movement of arm 28.

Passageway 16 is next formed by inserting a pointed object through bottom portion 17 as shown best in FIG. 2. The resulting clay bowl 10 may then be decorated and covered with a glaze and fired in a conventional manner.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A process for forming a pottery bowl and catch tray wherein said pottery bowl and catch tray are integral including the steps of placing a portion of clay into a first mold half having the shape of the exterior of said pottery bowl, slowly forcing a second mold half into said first mold half by way of a ram press, said second mold half having the shape of the interior of said pottery bowl thereby forming a greenware bowl, and parting said first and second mold halves and removing said greenware bowl, wherein the improvement comprises;

forming a thickened sidewall at the bottom of said greenware bowl during said forcing of said second mold half into said first mold half;

placing the said greenware bowl with said thickened sidewall onto a bat on a potter's wheel and turning said bat and said greenware bowl; and slowly moving a shaping tool including a tip at an angle from the horizontal so that said tip contacts said thickened sidewall and penetrates into said thickened sidewall at said bottom of said greenware bowl thereby forming said thickened sidewall into said integral catch tray, said integral catch tray including air upwardly extending catch tray wall and a catch tray rim.

2. The improved process of claim 1 wherein said shaping tool has a hemispherical tip.

3. The improved process of claim 2 wherein said shaping tool has means for emitting a stream of water at the center of said hemispherical tip.

4. The improved process of claim 1 wherein said angle from the horizontal of said shaping tool is about 45 degrees.

5. The improved process of claim 1 wherein said forming tool is held in a guide and is movable only in a longitudinal direction.

6. The improved process of claim 1 further including the step of forming a passageway through a portion of the sidewall of said bowl near said bottom thereof, said passageway being positioned below said catch tray rim.

* * * * *